United States Patent [19]
Monson

[11] Patent Number: 5,995,902
[45] Date of Patent: Nov. 30, 1999

[54] PROACTIVE SWATH PLANNING SYSTEM FOR ASSISTING AND GUIDING A VEHICLE OPERATOR

[75] Inventor: Robert J. Monson, St. Paul, Minn.

[73] Assignee: Ag-Chem Equipment Co., Inc., Minnetonka, Minn.

[21] Appl. No.: 08/864,646

[22] Filed: May 29, 1997

[51] Int. Cl.[6] ................................................. G06F 165/00
[52] U.S. Cl. ........................... 701/202; 701/205; 345/442
[58] Field of Search .................................. 701/202, 205, 701/213, 300, 50; 345/442, 441, 438, 475

[56] References Cited

U.S. PATENT DOCUMENTS

| 4,603,753 | 8/1986 | Yoshimura et al. ..................... 180/131 |
| 4,658,911 | 4/1987 | Drever et al. ........................... 172/776 |
| 4,860,007 | 8/1989 | Konicke et al. ........................ 340/173 |
| 4,999,780 | 3/1991 | Mitchell ................................... 364/428 |
| 5,289,185 | 2/1994 | Ramier et al. .......................... 340/971 |
| 5,414,801 | 5/1995 | Smith et al. ............................. 395/119 |
| 5,438,817 | 8/1995 | Nakamura ............................. 56/10.2 A |
| 5,459,820 | 10/1995 | Schroeder et al. ...................... 395/120 |
| 5,471,574 | 11/1995 | Prasad ..................................... 395/142 |
| 5,606,850 | 3/1997 | Nakamura ............................. 56/10.2 A |
| 5,615,118 | 3/1997 | Frank ................................ 364/424.013 |
| 5,704,546 | 1/1998 | Henderson et al. ........................ 239/1 |
| 5,790,428 | 8/1998 | Easton et al. ........................... 364/561 |

*Primary Examiner*—Tan Nguyen
*Attorney, Agent, or Firm*—Kinney & Lange

[57] ABSTRACT

A swath planning system accepts curved path information to synthesize and generate parallel curved paths. The swath planning system terminates the generation of parallel curved paths which exceed physical limitations of the associated machinery. The swath planning system provides an operator with significant advance information to create a more efficient and relaxed product application. The swath planning system further provides environmental advantages to all through enhanced resource management by eliminating or significantly reducing ground and/or water contamination and by eliminating or significantly reducing product waste due to more precise and accurate placement of resources.

32 Claims, 7 Drawing Sheets

PROACTIVE SWATH PLANNING SYSTEM FOR ASSISTING AND GUIDING A VEHICLE OPERATOR

BACKGROUND OF THE INVENTION

1. Field of the Invention

This present invention relates generally to swathing systems, and more particularly to a proactive swath planning system having improved capability for assisting and guiding a vehicle operator in swathing a selected geographic area.

2. Description of the Prior Art

Various swathing systems and associated methods of control have been suggested at one time or another, but in each instance, these known swathing systems leave something to be desired. For example, there is a need in the swathing systems industry for a proactive swath planning system that precisely and accurately assists a vehicle operator in guiding the vehicle over a selected geographical area, e.g. farm field, whenever the vehicle traverses a product delivery area. Such a proactive swath planning system is highly desirable in areas where a foam marker cannot be readily applied, such as in wheat fields, or when operating at night. For example, it is possible to increase the production capability of certain vehicles significantly through the efficient application of a swathing system. Global Positioning System (GPS) designers and users including, but not limited to those in the agricultural community, have not yet recognized the necessity for providing a proactive swath planning system. This problem has been totally ignored by the swathing products industry because the focus of this industry has been concentrated on machines and associated reactive methods to assist a vehicle operator in guiding the vehicle in response to the amount of distance the vehicle moves away from a planned path, in contradistinction with the aforesaid highly desirable proactive swath planning system.

Numerous different types of swathing systems are available today. These systems may include a pull type unit (towed) or a self-propelled unit. Presently, these systems do not provide a proactive means to assist and guide a vehicle operator along a predetermined swathing path. These known systems do provide a way to assist the vehicle operator in returning the vehicle to a predetermined swathing path as the vehicle moves away from the aforesaid predetermined swathing path. As stated above, they do not provide any proactive information to assist and guide a vehicle operator in a manner that accurately and precisely ensures and maintains the vehicle on a predetermined swathing path. Present swathing system designs generally incorporate the use of precise digital GPS signals to guide the vehicle when in the field. Most often, this is accomplished through the use of a real-time kinematic (RTK) differential GPS and a light bar. These systems guide the operator by displaying on the light bar, the displacement of the vehicle from the intended line of travel. An obvious limitation of this type of system is the need to follow a straight line for proper swathing. This is clearly impossible in a large number of fields, and therefor renders this technique of swathing useless in those instances. It would be of significant use to have a swath planning system enabling the parallel generation of curved path lines. Such a swath planning system would allow a more diverse field condition to be addressed by the swathing system. Another limitation of the aforesaid known swathing systems embraces the nature of the information presented to the vehicle operator. As stated herein above, this information is presented in a light bar format, and consists of a lateral measure signifying the distance off-line the vehicle operator is presently driving This approach results in a system that enables a reactive driver to drive towards the preferred line of travel, but does not allow or provide a great deal of advance, or proactive information. It is therefore desirable to provide the operator a planned path for the vehicle, providing forward data that would reduce the total amount of cumulative error.

In view of the above, it is highly desirable to provide a parallel path swath planning system which will allow a curving path to be input to the system for parallel path generation and allow vehicle steering based upon the position the machine is in, rather than the position it should be in.

U.S. Pat. No. 5,615,118, issued Mar. 25, 1997, to Frank, entitled *Onboard Aircraft Flight Path Optimization System*, discloses a performance management computer, a control display unit, an infrared probe, a temperature probe, a weather radar, an inertial navigation system, and comparing apparatus to achieve an altitude that has less head wind and is therefore more economically efficient. U.S. Pat. No. 5,606,850, issued Mar. 4, 1997, to Nakamura, entitled *Outdoor Working Automating System* discloses a rice reaper that includes an automated working system that causes a memory to store a route previously traversed by the rice reaper. U.S. Pat. No. 5,471,574, issued Nov. 28, 1995, to Prasad, entitled *Improved Method For Displaying A Computer Generated Graphic On A Raster Output Scanner*, discloses a method to determine if parallel lines can be developed for an entire trajectory. U.S. Patent Number 5,459,820, issued Oct. 17, 1995, to Schroeder et al., entitled *Method For Graphical Display Of Three-Dimensional Vector Fields*, discloses a graphic technique for visualizing 3-D vector data on a graphics computer.

Other exemplary U.S. patents that disclose apparatus and methods directed to automatic control and/or visual display of machine movement include U.S. Pat. No. 5,438,817, issued Aug. 8, 1995, to Nakamura; U.S. Pat. No. 5,414,801, issued May 9, 1995, to Smith et al.; U.S. Pat. No. 5,289,185, issued Feb. 22, 1994, to Ramier et al.; U.S. Pat. No. 4,999,780, issued Mar. 12, 1991, to Mitchell; U.S. Pat. No. 4,860,007, issued Aug. 22, 1989, to Konicke et al.; and U.S. Pat. No. 4,603,753, issued Aug. 5, 1986, to Yoshimura et al.

Modern mobile product applicator machine control systems typically have a host controller located within the operator cab of the machine, including a processor with associated input and output devices. The host is generally directly linked to at least one other controller which may also be located within the cab, and which is responsible for all communication to devices on the machine, such as shown in U.S. Pat. No. 4,630,773, issued Dec. 23, 1986, to Ortlip, entitled *Method and Apparatus for Spreading Fertilizer*, and U.S. Pat. No. Re 35,100, issued Nov. 28, 1995, to Monson et al., entitled *Variable Rate Application System*, both assigned to Ag-Chem Equipment Company, Inc. of Minnetonka, Minn., the Assignee of the present invention. The system disclosed in the '100 reissue patent comprises a controller accessing a soil map indicating a soil characteristic for each portion of the field. Field locations and status maps indicating current crop input level at various locations in a field to be treated are monitored by a control system. A crop input map is updated after a dispensing pass to provide a real-time record. Position locators for the machine in the field may include "Dead Reckoning", GPS, or LORAN systems, for example.

U.S. Pat. No. 5,355,815 discloses yet another closed-loop variable rate applicator system. The system operates by determining a soil prescription in near real-time and dispenses crop inputs to the soil scene as a fraction of the soil prescription. The '815 patent is also assigned to Ag-Chem Equipment Company, Inc. and is incorporated herein by reference in its entirety.

Another system is disclosed in U.S. Pat. No. 5,453,924, issued Sep. 26, 1995, to Monson et al., entitled *Mobile Control System Responsive To Land Area Maps*. This system expands on earlier known applicator machine controls systems including those heretofore assigned to Ag-Chem Equipment Company, Inc., by incorporating a network scheme which links a host controller positioned within the operator cab to multiple controllers located at various points on the machine external to the operator cab. All of the above patents are assigned to the Assignee of the present invention and are incorporated by reference in their entirety herein. The control systems assigned to Ag-Chem Equipment Co., Inc. and referenced herein above describe systems which, when properly configured with the present inventive algorithmic software and associated sensors and feedback devices, may be adapted to practice the present invention.

SUMMARY OF THE INVENTION

The limitations of the background art discussed herein above are overcome by the present invention which includes a swath planning system for use in assisting vehicle operators in guiding a vehicle through a field at night and/or in areas where a foam marker cannot be readily applied, e.g. wheat fields. The present inventive swath planning system addresses many of the problems associated with the unaccounted for effects of misapplied products which result from use of those certain known swathing procedures to control the location of products dispensed from a mobile product applicator machine. The present inventive swath planning system also will provide a machine capable of higher consistency of output. Presently known swathing systems are limited by their structures and methods to control of product application via reactive techniques that do not allow complex paths to be processed, resulting in less than optimum product spreading paths requiring operator input to the system on-the-go. In contrast, the present swath planning system is a proactive swathing system that is customized to accurately and precisely assist the vehicle operator to guide the product application vehicle or other desired type of vehicle along the most efficient path for spreading products. These aforesaid products may include, but are not limited to chemicals, manure, fertilizer, seeds, various waste products, or any other products that are suitably dispensed by a mobile product application machine.

The novel swath planning system allows curved path information to be input to a host computer system for parallel path generation. A path generation algorithm assesses the rate of curvature of new predicted paths to assure impossible geometry does not result and further provides planning data to the vehicle operator to allow vehicle steering based upon the present position of the machine in contradistinction with the position it should be in. The novel path generation algorithm most preferably utilizes a curve fitting technique such as linear regression or spline geometry to analyze existing path data segments and generate new swathing paths that guarantee a known boom width distance exists between adjacent parallel paths. When a parallel path segment conflicts with known machinery limitations, the respective path segment is terminated and a new path created.

The swath planning system vehicle operator is most preferably provided with a visible series of panes or frames that he must drive through. This provides the operator multiple feedback sources, such as relative frame size and the normal path that would lie through the center of each frame, thereby allowing the operator to find the most efficient line back to the desired swathing path, simply by observing a display. The vehicle operator can also be provided with a calculated swathing path that represents a most efficient path. Such paths will allow the operator to anticipate changes in a swathing path that are impossible to meet with present technology.

The present inventive swath planning system therefore provides a vast improvement over swathing systems known in the art which use reactive methods to control application of products via a mobile product application machine. The aforesaid improvement is the result of providing a swath planning system, as stated herein before, in which the applicator machine is customized with algorithmic software to ensure that proactive swath planning information is available for use in near real-time by the machine operator. The novel swath planning system has a data processor that is responsive to curving path information for parallel path generation and for assessing the rate of curvature of the predicted paths to assure impossible geometry does not result. A feedback system conveys this information to a machine operator on-the-go via a display apparatus, allowing the operator to make timely adjustments to vary the vehicle steering on-the-go.

As used herein, the following words have the following meanings. The words "algorithmic software" mean an algorithmic program used to direct the processing of data by a computer or data processing device. "Data extraction" is a software directed or device-implemented process of selecting data from a given set of data points based on a predefined criteria for selection among the set. The word "expand" means to create new data points based on a parameter or parameters consistent with a selected group of existing data points. The words "software implemented" as used herein refer to the use of a software program on a particular computer system. The words "discrete data" as used herein are interchangeable with "digitized data" and "digitized data" as used herein means data which are electromagnetically stored in the form of singularly isolated, discontinuous data or digits. The words "data processing device" as used herein refer to a CPU and an interface system. The interface system provides access to the CPU such that data could be entered and processed by the data processing device.

In one aspect of the present invention, the construction and arrangement is employed wherein a swath planning system allows curved path information to be input to the system to generate parallel path information.

In yet another aspect of the present invention, the construction and arrangement is employed wherein a swath planning system assesses the rate of curvature of predicted swathing paths to assure impossible geometry does not result.

Still another aspect of the present invention employs a construction and arrangement wherein a swath planning system provides planning data to a vehicle operator to allow steering based upon the position the machine is in, rather than the position the machine should be in.

Another aspect of the present employs a construction and arrangement for a swath planning system utilizing algorithmic software to generate a parallel curved track on-the-go in near real-time.

Still another aspect of the present invention employs a construction and arrangement wherein a swath planning system generates curved swathing paths that ensure a boom width distance exists between adjacent swathing paths.

Yet another aspect of the present invention employs a construction and arrangement wherein a swath planning system provides a vehicle operator with significant advance information to allow creation of more efficient product application.

A feature of the present invention is the provision of a swath planning system resulting in environmental gains for all due to reduced or elimination of water and ground contamination as well as reduced waste of product resources as a consequence of proactive information feedback allowing the operator to create more efficient product applications.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

DETAILED DESCRIPTION OF THE PREFERRED EMBODIMENTS

Figure 1:
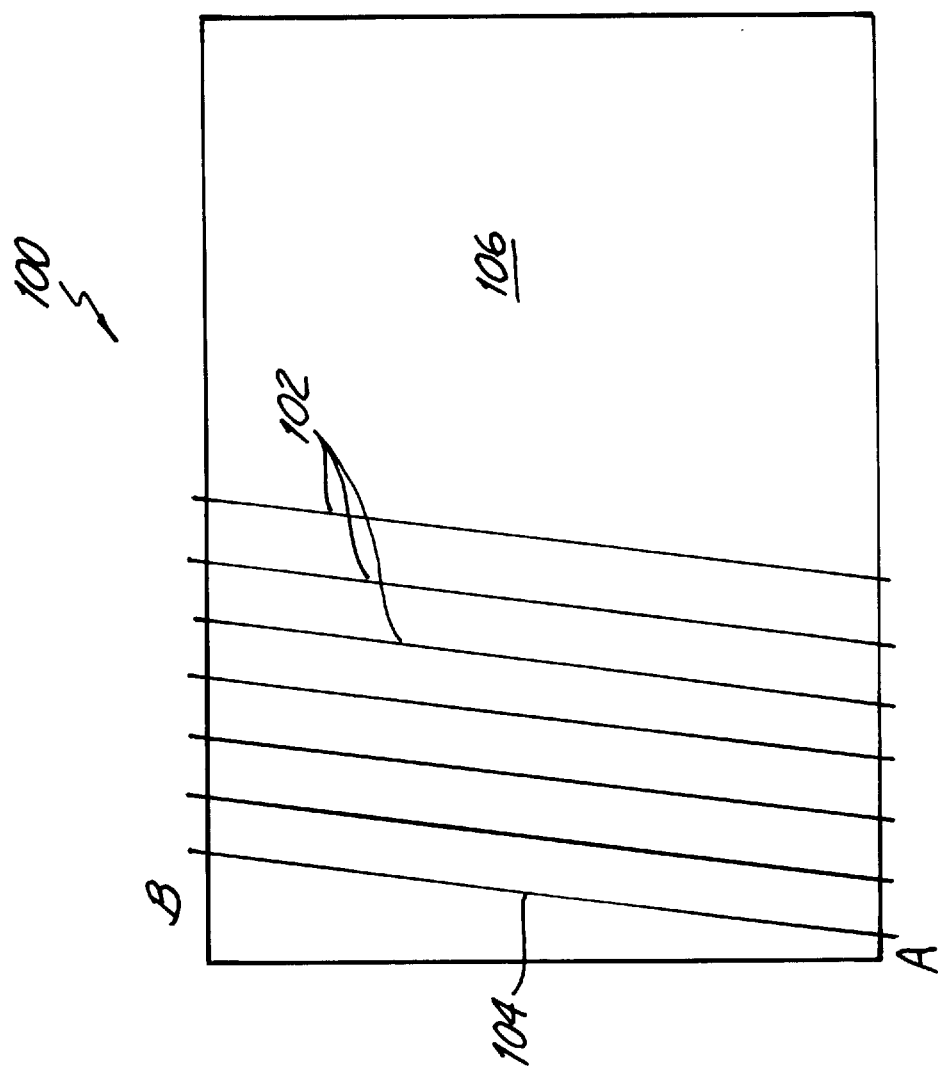
FIG. 1 is a simplified diagram illustrating the formation of typical straight swath lines suitable for use with presently known swathing systems.

The preferred embodiments described as follows, address the long felt need by those in the GPS and agricultural products applicator industries to provide a swath system that proactively assists an operator in guiding a vehicle through a field or other predetermined geographical area. Looking now at FIG. 1, a simplified diagram illustrates the formation of a parallel swathing pattern 100 having typical straight swath lines 102 familiar to those skilled in the art and suitable for use with presently known swathing systems. This parallel swathing pattern 100 illustrates the limited type of guidance that is presently available with known swathing systems. Such parallel swath patterns 100 are created first by formation of an initial swath line (A-B) 104. This initial swath line 104 is utilized as a vehicle traverses the field 106 one swath at a time. An obvious limitation of this type of swath pattern 100 is the need to follow a straight swath line 102 in order to accomplish proper swathing. Such a limitation makes it impossible to establish a proper swathing pattern for a large number of fields, and therefore renders this technique of swathing useless in those particular instances. As stated herein before, another limitation inherent with known swathing systems embraces the nature of the information presented to the vehicle operator. Known swathing systems present this information in the form of a light bar format, and consists of a lateral measure signifying the distance off-line the vehicle operator is presently driving. This type of feedback information results in a system that enables a reactive driver to drive towards a preferred line of travel, but does not allow a great deal, if any, of advance, or proactive planning information. The present invention addresses the aforesaid shortcoming and attendant disadvantages that are inherent with known swathing systems by providing a novel swath planning system that allows the vehicle operator to traverse the most efficient path based on the present position and heading of the vehicle. This novel swath planning system processes curved path information to generate curved swath tracks optimized for use within the physical limitations of the particular operator's vehicle.

Figure 2:
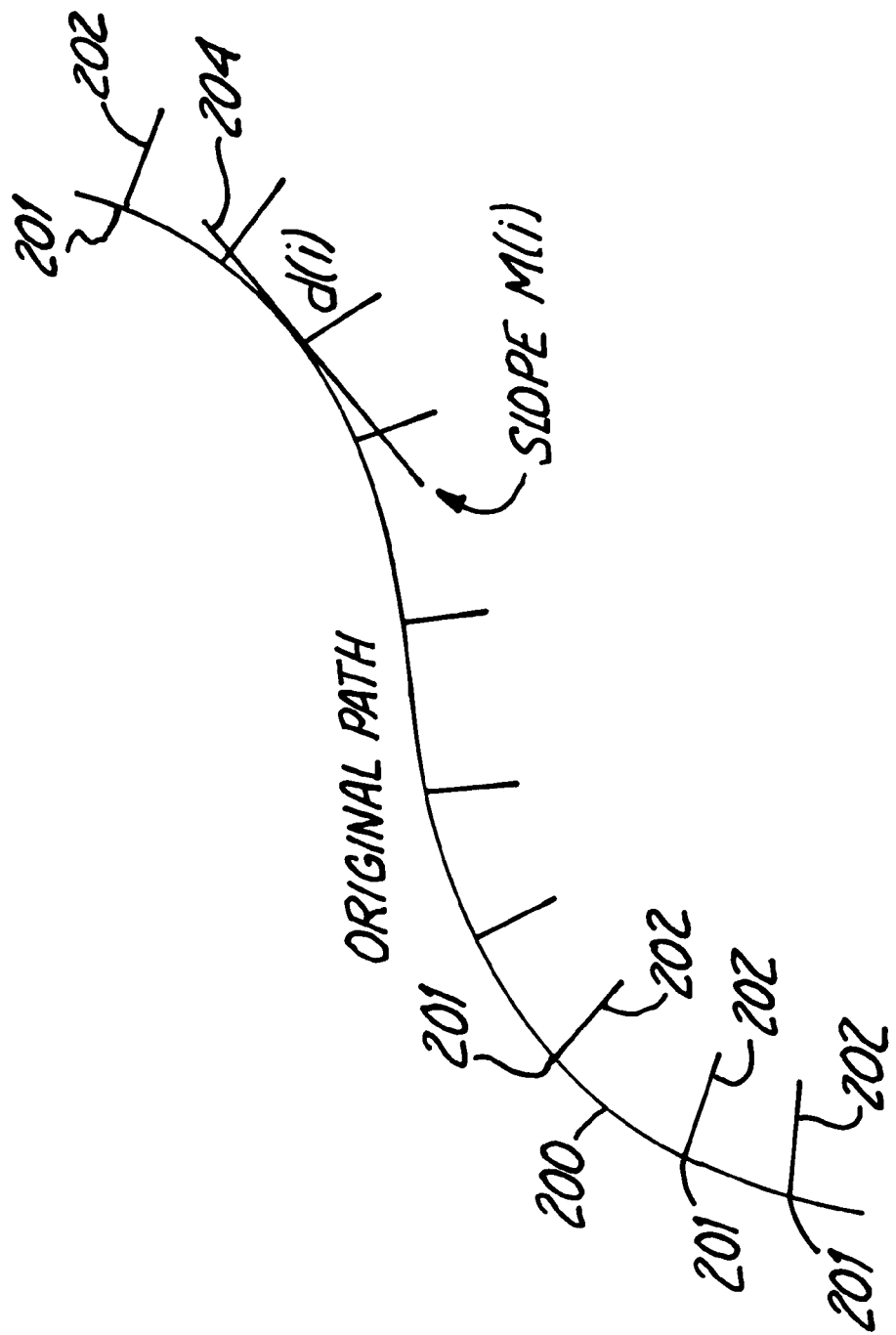
FIG. 2 illustrates one embodiment of a curved path swath line that can be used as a baseline within the present swath planning system to generate a parallel curved track.

Details for one preferred embodiment of the present swath planning system will now be described herein with reference first to FIG. 2. FIG. 2 illustrates one embodiment of a curved path swath line 200 that can be used as a baseline within the present swath planning system to generate a parallel curved track in conformance with the present invention. It will readily be understood that the curved path swath line 200 is simply one of an infinite number of curved path swath lines that could be used by the present swath planning system to generate one or more parallel curved tracks for use with a swathing vehicle. Use of curved tracks have been problematic for known swathing systems because such systems have been limited by the use of reactive apparatus and methods that have been inadequate to successfully traverse a field or other geographic area in response to the aforesaid curved track information. Looking again at FIG. 2, the present swath planning system has an algorithmic software incorporated therein to analyze the initial curved path swath line 200. The algorithmic software analyzes this initial curved path swath line 200 via data d(i) representative of predetermined path segments 201 to determine the slope M(i) 204 of each of the path segments 201 using the familiar linear mathematical relationship exhibited by the following equation: $M=(X_1-X_2)/(Y_1-Y_2)$. The slopes M(i) 204 are then used to create a normal line 202 to the existing line segment for each path segment 202.

Figure 3:
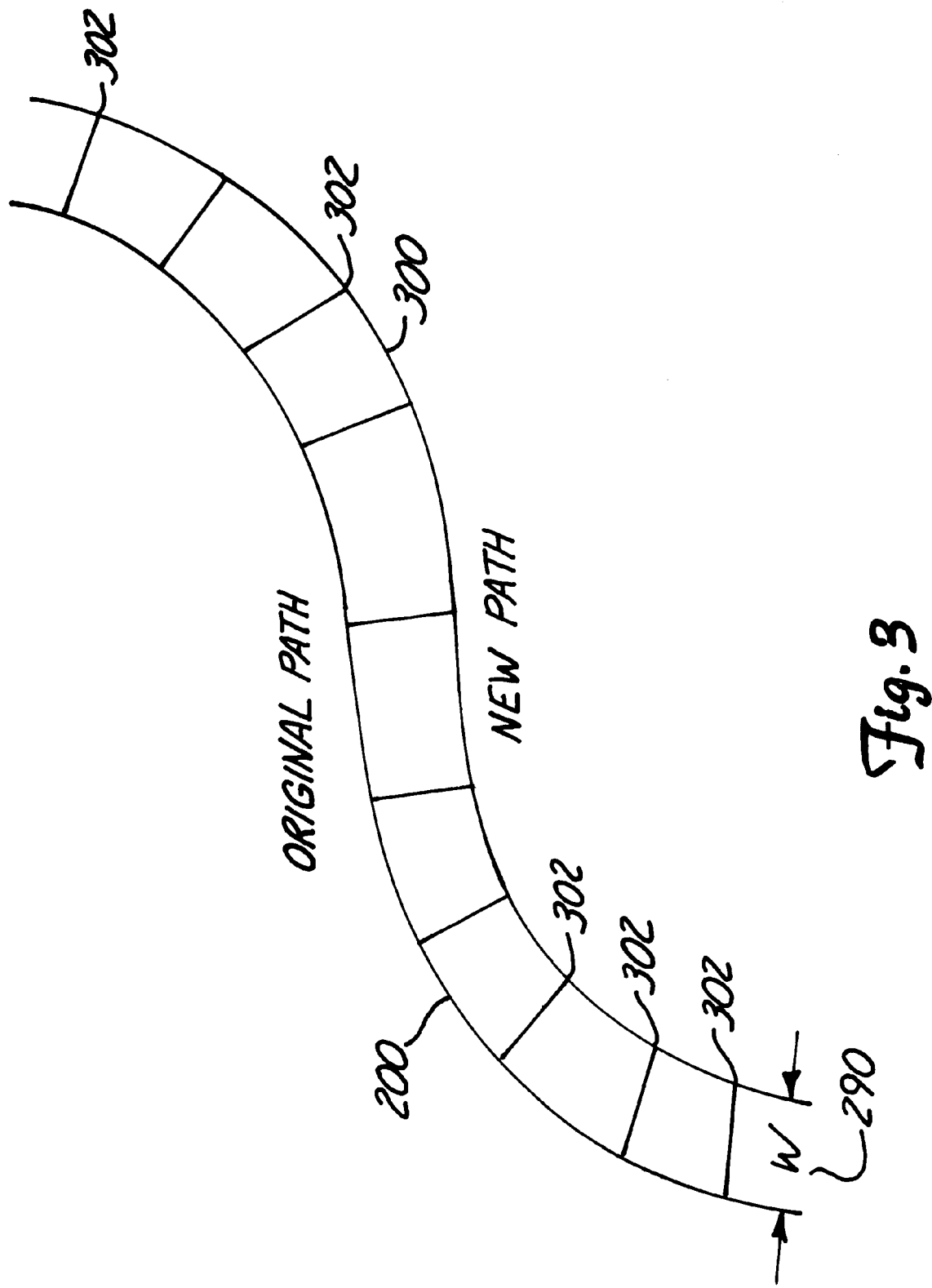
FIG. 3 illustrates one embodiment of a parallel curved track generated via the present swath planning system utilizing the curved path swath line depicted in FIG. 2.

Moving now to FIG. 3, a predetermined distance (W) 290 offset from the initial curved path swath line 200, such as one boom width (W) is then utilized by the algorithmic software to create a data point P(i) 302 for the new parallel track 300. Each data point P(i) 302 is determined by utilizing the standard mathematical equation familiar to those skilled in the mathematical art, for calculating the distance from a point to a line. The new parallel track 300 can then be determined via a curve fitting technique such as spline fitting applied to the data points P(i) 302 created in the process. This technique assures a predetermined boom width or any other predetermined distance exists between the initial curved path swath line 200 and the new parallel track 300, and provides the planned path for the vehicle.

Figure 4:
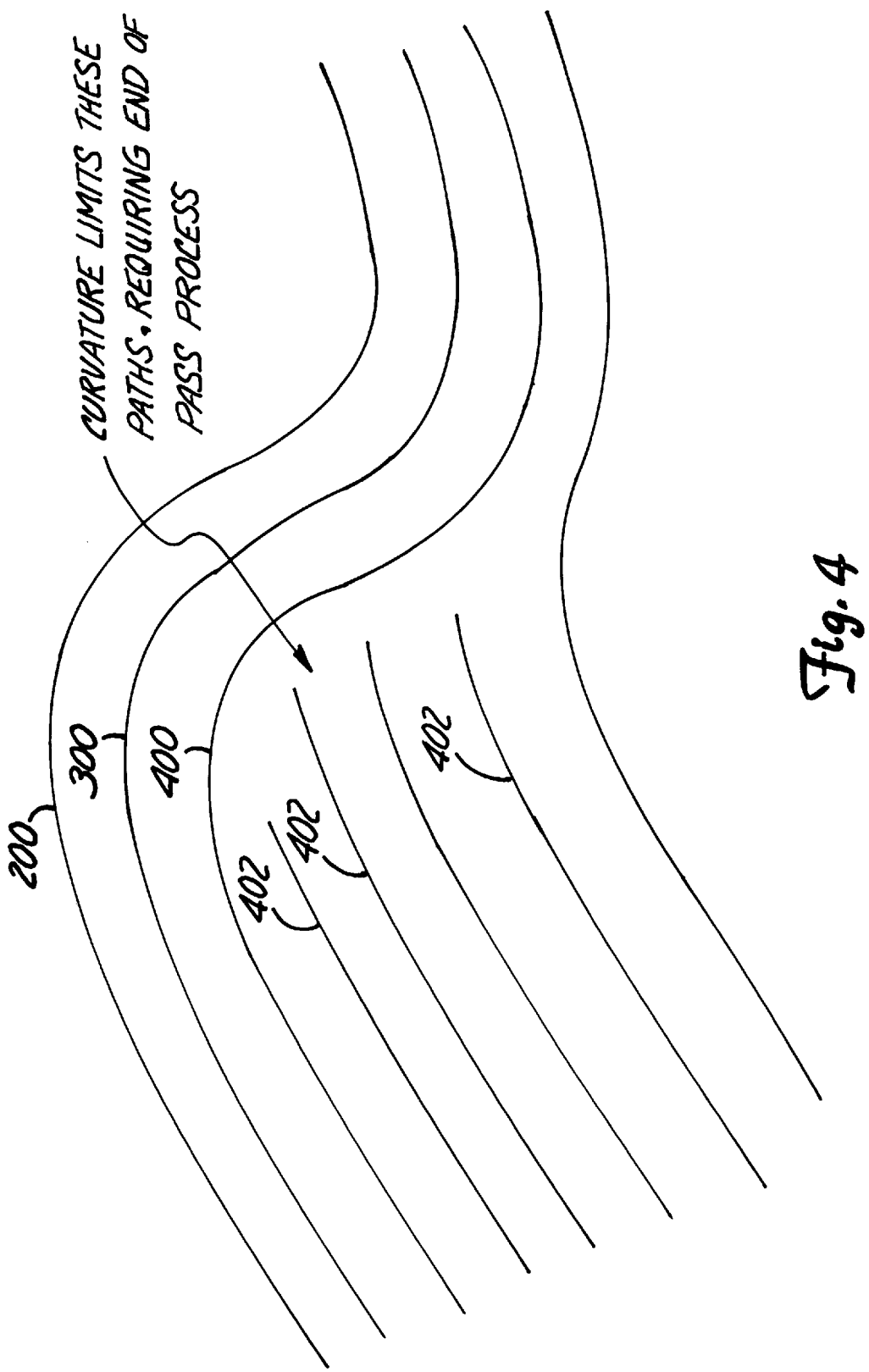
FIG. 4 is a top view depicting a family of swath tracks generated via the present swath planning system that illustrate creation and ending swath track generation in response to predetermined swath path curvature data.

FIG. 4 is a top view depicting a family of swath tracks generated via the present swath planning system that illustrate creation and ending swath track generation in response to predetermined swath path curvature data. It can readily be seen that the rate of curvature of any new curved parallel track will be different than the rate of curvature of any original or initial curved path. This limitation is the most difficult part of creating a new parallel track and also causes some difficulty due to the limited ability of the vehicle and associated machinery to traverse any curved track at certain rates of curvature. Due to the nature of the aforesaid limitations, it is necessary to determine the amount of change in slope for any new curved track with respect to the linear displacement between its associated line segments. When that amount becomes too large, i.e. slope is rapidly changing, the segment will be terminated and a new track started. For example, looking again at FIG. 4, it can be seen that parallel curved tracks 300 and 400 generated from the initial curved path 200, have been completed because the instant vehicle of interest and any associated equipment, e.g. boom, used for the swathing operation can accurately and precisely follow the new curved tracks 300, 400. However, the family of parallel swath tracks 402 have also been generated via the present algorithmic software because the rates of curvature of any one of these tracks 402 would have been too great for the instant vehicle of interest and its associated equipment to accurately traverse. The ability of the present swath planning system to process extremely complex paths results in a system that will not demand more than any predetermined vehicle and/or its associated equipment can deliver, thereby eliminating any wasted valuable processing time creating a track the vehicle operator cannot utilize. For those vehicle operators unfamiliar with certain fields or other geographical areas, this processing ability will create a 'most efficient' path for spreading selected products, reducing the dependence upon the vehicle operator to provide that information. It is thus apparent the present swath planning system then provides the added advantage of enabling higher consistency of output.

Figure 5:
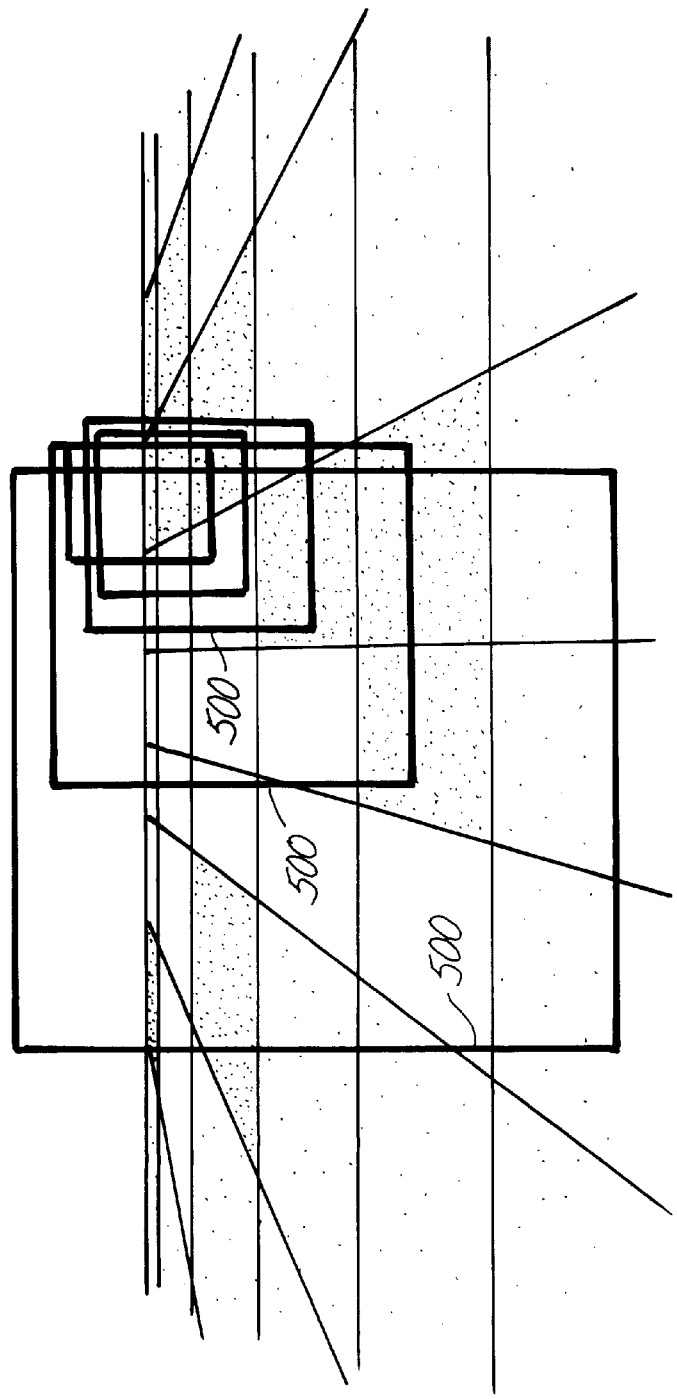
FIG. 5 illustrates one embodiment of a frontal display view depicting a series of frames that provide a swath planning system vehicle operator an optical feedback source to find the most efficient line back to a desired path and suitable for use with the present swath planning system.

The present inventor has found that swath path data provided to the vehicle operator can be greatly improved over what is presently available in the art. For example, FIG. 5 illustrates one embodiment of a frontal display view depicting a series of frames 500 that provide a swath planning system vehicle operator an optical feedback source to find the most efficient line back to a desired path and suitable for use with the present swath planning system. Because the path is planned, the information provided can be more proactive than previously possible with known swath systems. Since the information is planned, the present inventor has found it preferable to present such planned information to the vehicle operator in a different format, such as shown in FIG. 5. Most preferably, the vehicle operator is provided with a series of panes or frames 500 which he must drive through. This technique provides the operator multiple feedback sources, as he can see the relative size of each frame 500, and the normal path which would lie through the center of each frame 500. It can readily be seen that the vehicle operator would then be able to find the most efficient line back to the desired path simply by observing the display. The vehicle operator can also be provided a displayed calculated path that would represent the aforesaid most efficient line. These paths will allow the vehicle operator to anticipate the changes in path that are impossible with present technology.

It is well known that many vehicle operators find the use of a light bar to be exhausting. The present swath planning system creates a more efficient and relaxed method of swathing to accomplish selected functions, e.g. product application. Due to the aforesaid advantages, it is clear that the most preferred method of planned swath systems will include curved path generation, path curvature limiting, and recommended path output in a format that allow the vehicle operator to proactively steer the vehicle. Known systems have not served to simplify the swathing operation of the vehicle, and have limited the vehicle operator in his freedom to complete the job in a manner he deems most efficient. The present swath planning system will allow vehicle, e.g. Site-Specific equipment operators much needed flexibility and simplify their overall responsibilities.

Figure 6:
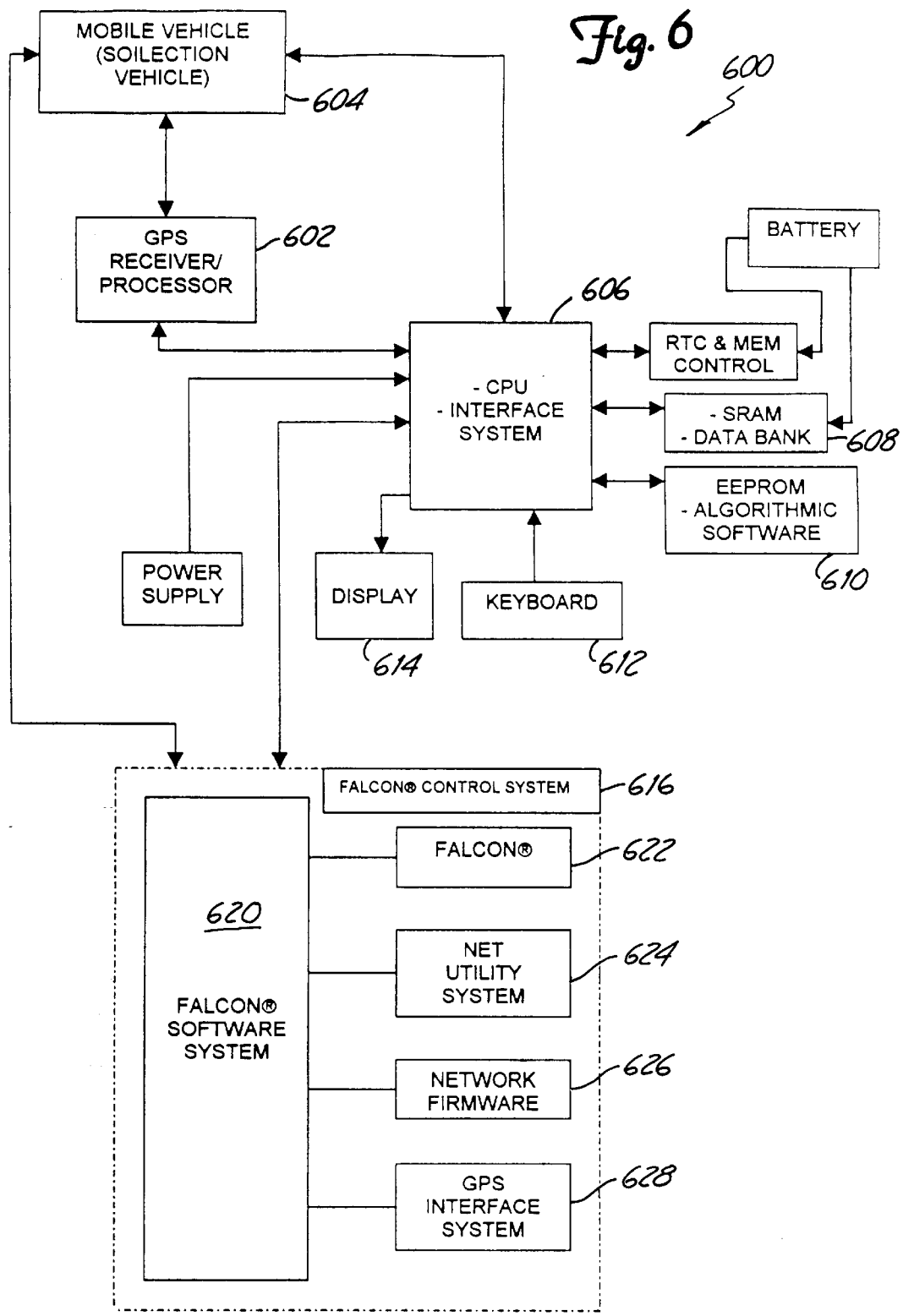
FIG. 6 is a simplified block diagram illustrating one embodiment of the present mobile swath planning system operatively coupled to a product application vehicle suitable for spreading one or more predetermined products in accordance with the present invention.

The present invention operates in cooperation with, preferably, several systems. Referring to FIG. 6, one preferred embodiment for the present swath planning system 600 includes the use of Global Positioning System (GPS) 602. The GPS 602 is an accurate three-dimensional global positioning satellite system which provides radio positioning and navigation needs. The GPS 602 receiver and data processor is hosted in this instance by a SOILECTION® vehicle 604. Generally the swath planning system 600 is initiated when the receiver starts to track pseudo-random noise from a plurality of satellites and generates time of arrival values. Thereafter, the GPS 600 data processor takes over. The GPS 602 data processor first samples the time of arrival values from the GPS constellation for each of the aforesaid plurality of satellites and multiplies the sample data by the speed of light to produce a plurality of pseudo-range measurements. The data processor then adjusts these pseudo-range measurements to compensate for deterministic errors such as the difference between each satellite's clock and GPS system time, atmospheric distortion of the signals and other considerations such as relativity factors. The GPS 602 receiver includes an instruction set which gathers the information need to compute adjustments to the pseudo-range measurements from a 50 Hz digital data stream which the satellites broadcast along with their precision and coarse acquisition code. After the data processor makes all the necessary adjustments to the pseudo-range measurements, it then performs the position/time solution process to determine the present vehicle position. The data processor computes its X, Y, Z position fix in terms of the World Geodetic System adapted in 1984, which is the basis on which the GPS develops its worldwide common grid references. Generally, the X, Y, Z coordinates are converted to latitude, longitude and altitude map datum prior to output or display. The GPS position solution is intrinsically referenced to the electrical phase center of the antenna. Finally, the data processor computes clock bias results which are one of the parameters to be considered in addition to the X, Y, Z coordinates. The clock bias is computed in terms of the time offset of the clock in the GPS 602 receiver versus GPS system time.

Accordingly, the vehicle, e.g. SOILECTION® vehicle, 604 receives the GPS position data which information is processed via the host CPU 606 to establish the initial swath path 200. The initial swath path 200 data is stored in a database within a first memory unit 608. This data is extracted via instructions determined by the algorithmic software stored in yet another (second) memory unit 610 and subsequently processed via the CPU 606 to determine the family of most efficient parallel swath paths such as depicted in FIG. 4. The host CPU 606 and associated I/O devices 612, 614, memory devices 608, 610, and other related devices most preferably comprise part of a cab mounted PC system specifically designed to operate in a mobile environment.

In one preferred embodiment of the present invention, the swath planning system 600 interacts with a FALCON® control system 616 to further enable the automation of site-specific farming. The FALCON® control system 616 is available from Ag-Chem Equipment Co., Inc. of Minnetonka, Minn. For a background in current site-specific precision farming and software controls, reference is herein made to: R. J. Monson, *THE FALCON CONTROL SYSTEM FOR SOILECTION*, written for presentation at the 1995 ASAE Annual International Meeting sponsored by ASAE, Jun. 18–23, 1995, and R. J. Monson, *THE APPLICATION OF DISTRIBUTED CONTROL AND THE WINDOWS USER INTERFACE ON MOBILE AGRICULTURE EQUIPMENT*, written for presentation at the 1995 ASAE Annual International Meeting sponsored by ASAE, Jun. 18–23, 1995, each of which are incorporated herein by reference in their entirety.

Looking again at FIG. 6, a block diagram representation of the integration of the aforesaid FALCON® control system 616 with the present swath planning system 600 and a SOILECTION® vehicle is illustrated. A detailed description of the FALCON® control system 616 is given in U.S. patent application by R. J. Monson, titled *AUTOMATIC TOPOGRAPHICAL MODEL GENERATION METHOD AND APPARATUS*, filed Jan. 22, 1996 and so therefore will be described herein with brevity to preserve clarity in describing the present invention. The FALCON® system 616 includes the FALCON® software system 620 that further includes a family of subdirectories. These subdirectories include: FALCON® 622 which functions as host system and interface; net utility 624 which functions as a network utilities and diagnostics software; network firmware 626 in which a downloadable Neuron C® code preferably resides; and GPS interface 628 which is a dedicated section of the software dealing with GPS data reception and processing. As may be readily understood from FIG. 6, the present swath planning system 600 acquires position information from the GPS 602 receiver/processor to predict and display a family of most efficient paths usable by the vehicle operator. When the operator traverses this family of efficient paths, the position information is transferred to the FALCON® control system which then controls the prescription and rates of product discharged from the SOILECTION® vehicle 604 for selected products according to predetermined product application data. Thus, as stated herein before, the implementation of the present swath planning system 600 enhances the FALCON® system 616 and further enables the automation of site-specific farming. Specifically, the present swath planning system 600 is integrated with the FALCON® control system 616 to provide a highly automated and user friendly information system in which site-specific spreading and allocation of products thereon are optimized.

Figure 7:
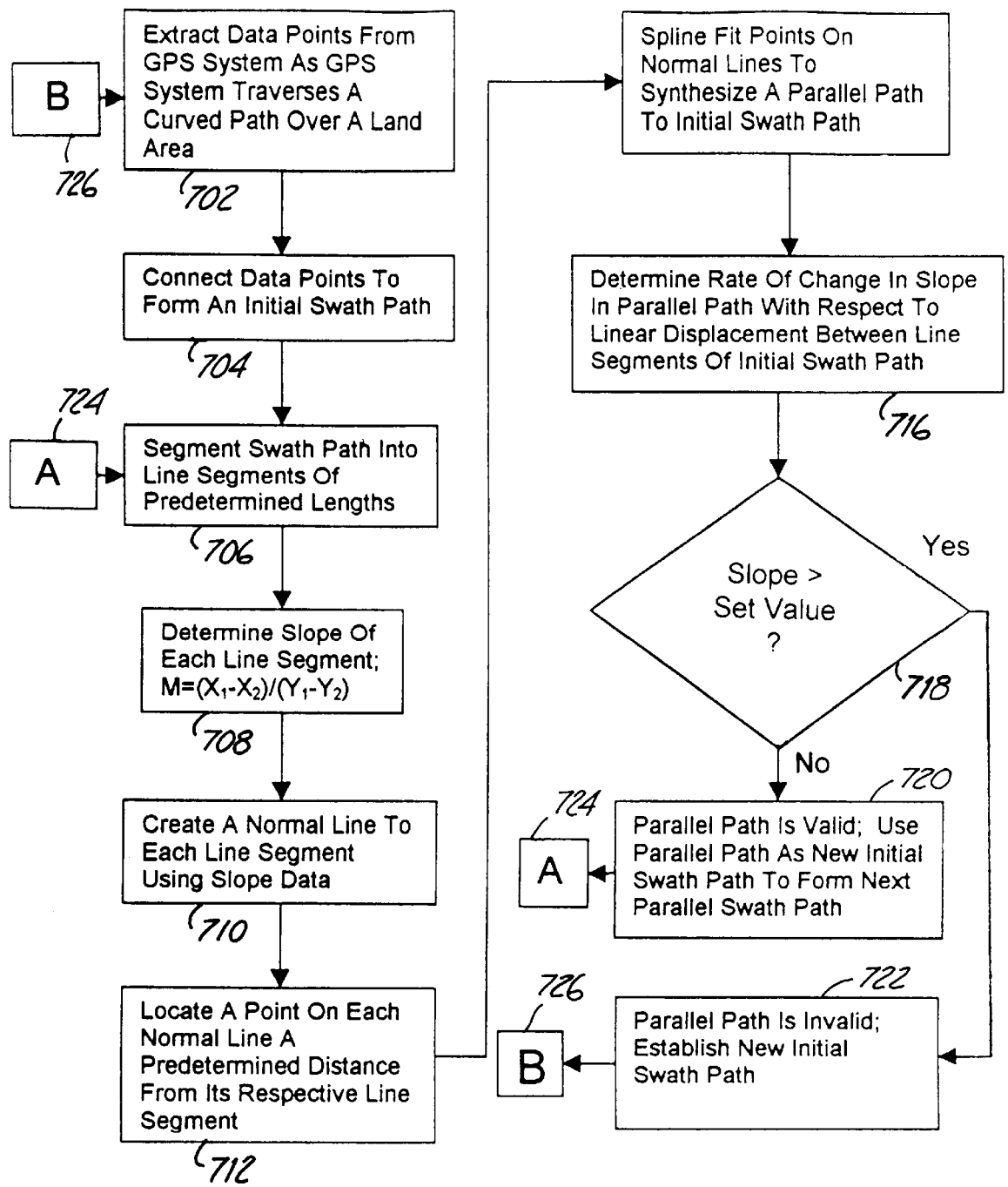
FIG. 7 is a simplified flow chart illustrating synthesization and generation of a family of swath paths in accordance with one preferred embodiment of the present invention.

Moving now to FIG. 7, a simplified flow chart illustrates synthesization and generation of a family of swath paths in accordance with one preferred embodiment of the present invention. As stated herein before, the present invention can be used with a GPS system 602. When the GPS system 602 initially traverses a land area, the swath planning system 600 extracts data points sufficient to formulate an initial swath path as shown in blocks 702 and 704. The initial swath path is then segmented into line segments of predetermined lengths as shown in block 706. A slope is determined for each line segment using methods familiar to those skilled in the mathematical arts such as shown in block 708. The slope determined in block 708 is then used to create a line that is normal to and unique to each line segment as shown in block 710. It will readily be appreciated that any vehicle and/or associated machinery using the planned swath paths will have particular physical limitations such as specific boom widths, minimum turning radius, and the like. These physical machine limitations will be used to locate a point on each normal line such that each point will lie on an adjacent parallel path and such that a particular boom will not over apply or under apply products to a predetermined land area, and further such that a particular piece of machinery will be physically able to precisely and accurately follow the parallel path. This step is depicted in block 712. The set of points are then connected via a procedure such as spline fitting, also familiar to those skilled in the mathematical arts, to synthesize an adjacent parallel path as shown in block 714. Upon formation of the aforesaid adjacent parallel path, the rate of change in slope with respect to the linear displacement between selected line segments on the initial swath path is determined for predetermined portions of the adjacent parallel path as shown in block 716. This rate of change is then compared with a known value that is unique to the particular equipment and/or machinery presently being used to follow the parallel paths. As stated herein above, the aforesaid equipment and/or machinery has specific physical limitations that will prevent the respective equipment and/or machinery from precisely and accurately following certain parallel paths due to the turning radius required. These physical limitations are used to determine the aforesaid unique value used to test the rate of slope change as such as shown in block 718. If the rate of change in slope does not exceed the unique value, then the synthesized parallel path is considered valid and the entire process can then be repeated to generate yet another parallel path as shown in blocks 720 and 724. If the rate of change in slope exceeds the unique value, then the synthesized parallel path is considered invalid. In this instance, a new initial swath path must be generated and the entire process restarted as shown in blocks 722 and 726.

This invention has been described herein in considerable detail in order to provide those skilled in the art with the information needed to apply the novel principles and to construct and use such specialized components as are required. In view of the foregoing descriptions, it should be apparent that the present invention represents a significant departure from the prior art in construction and operation. Further it provides for a more environmentally desirable approach to product resource management by eliminating or significantly reducing ground and/or water contamination in a field and further by eliminating or significantly reducing wasted resources by more accurate and precise placement of those resources. However, while a particular embodiment of the present invention has been described herein in detail, it is to be understood that various alterations, modifications and substitutions can be made therein without departing from the spirit and scope of the present invention, as defined in the claims which follow. For example, while embodiments described herein have for the most part been directed to agricultural applications, the present invention can just as easily be utilized in numerous other non-agriculture applications such as golf course care and management, lawn care management, nursery care management, or care and management of any predetermined geographical area sufficiently large to warrant utilization of swath tracks.

I claim:

1. A vehicle swath planning system comprising:
   a computer implemented device for automatic parallel swath path generation based upon initial vehicle swath path information, said device including:
   a data processing device;
   a data input device in communication with said data processing device;
   an algorithmic software directing said data processing device; and a data storage unit, wherein said initial vehicle swath path information is stored and supplied to said data processing device such that said data processing device, directed by said algorithmic software, automatically synthesizes and defines a family of parallel swath paths using an algorithmically defined relationship between initial vehicle swath path information and each member of the family of parallel swath paths, such that information representative of said family of parallel swath paths is stored and visually reported to a vehicle operator on-the-go in near real-time.

2. The vehicle swath planning system of claim 1 wherein said vehicle is self-propelled.

3. The vehicle swath planning system of claim 1 wherein said vehicle is equipped for towing.

4. The vehicle swath planning system of claim 1 wherein said family of parallel swath paths comprise a plurality of curved paths.

5. The vehicle swath planning system of claim 4 wherein said family of parallel swath paths further comprise a plurality of linear paths.

6. The vehicle swath planning system of claim 5 further comprising a receiver in communication with said data processing device, wherein said receiver receives GPS data inputs such that said data processing device can automatically synthesize said initial vehicle swath path information solely using said GPS data inputs.

7. The vehicle swath planning system of claim 6 further comprising a control system in communication with said data processing device such that said control system accesses said initial vehicle swath path information and said parallel path information stored in said data storage unit to visually guide said vehicle operator through a field and control the prescription and rate of product discharged from said vehicle to the field.

8. The vehicle swath planning system of claim 7 wherein said vehicle is equipped for applying predetermined products to a land area, said vehicle being integrated with said control system such that said control system controls application of said predetermined products to said land area.

9. A swath planning system for automatic parallel swath path generation based upon initial swath path information, said swath planning system comprising:
a computer system including a central processing unit, an input and output capability, and a memory capability;
a software system directing said computer system; and
a system interface, said computer system being directed by said software system and further being in communication with said interface system such that said initial swath path information is accessed through said interface system and said assessed initial swath path information is input into said computer system via said input capability such that parallel swath path information is automatically synthesized by said software system using an algorithmically defined relationship between initial swath path information and each member of parallel swath path information, such that said automatically synthesized parallel swath path information is stored in said memory capability and further such that said synthesized parallel swath path information can be visually reported to a system operator on-the-go in near real-time.

10. The swath planning system of claim 9 further comprising a control system integrated with a land vehicle, said control system being in communication with said interface system to provide access into said memory system of said computer system such that said automatically synthesized parallel swath path information stored in said memory capability can be readily accessed by said control system.

11. The swath planning system of claim 10 further comprising a receiver in communication with said computer system, wherein said receiver receives GPS data inputs such that said software system automatically synthesizes said initial swath path information solely using sad GPS data inputs.

12. A swath planning system for automatic parallel swath path generation based upon initial swath path information, said swath planning system comprising:
interfacing means for accessing said initial swath path information;
data processing means for processing said initial swath path information;
synthesizing means for automatically synthesizing parallel swath path information via predetermined algorithmic relationships between said initial swath path information and parallel swath path information; and
displaying means for visually displaying said parallel swath path information to a swath planning system operator on-the-go in near real-time.

13. The swath planning system of claim 12 wherein said parallel swath path information comprises a plurality of curved paths.

14. The swath planning system of claim 13 wherein said parallel swath path information further comprises a plurality of linear paths.

15. The swath planning system of claim 14 further comprising a GPS receiver, wherein said synthesizing means further includes a GPS interface for integrating GPS data within said synthesizing means to generate said initial swath path information.

16. A computer-implemented system for automatic parallel swath path generation from initial swath path information, the system comprising:
means for accessing said initial swath path information;
means for extracting selected data points from said initial swath path information;
means for expanding said selected data points by offsetting said points a predetermined distance to create spatially defined data points for a model;
means for transforming said spatially defined data points into parallel swath path information; and
means for visually displaying said parallel swath path information to a computer-implemented system operator on-the-go in near real-time.

17. The system of claim 16 wherein said means for extracting includes interfacing means for accessing data from a GPS receiver.

18. The system of claim 17 wherein said means for extracting and said means for expanding include a software system with algorithmic steps directing said computer-implemented system.

19. The system of claim 18 wherein said parallel swath path information comprises a plurality of curved paths.

20. The system of claim 19 wherein said parallel swath path information further comprises a plurality of linear paths.

21. A computer system directed by an algorithmic software for enhancing initial swath path data from a GPS receiver to generate a plurality of parallel swath paths, the computer comprising:
means for expanding said initial swath path data by selecting data points and offsetting said points a predetermined distance to form data points for a model;

means for processing and synthesizing said data points to transform said model into said plurality of parallel swath paths; and means for visually displaying said plurality of parallel swath paths.

22. The computer system of claim 21 wherein said means for expanding includes means for interpolation, extrapolation, interpretation, modeling and combinations thereof to expand said data points.

23. The computer system of claim 22 wherein said means for processing and synthesizing said data points include a software system directing said computer system.

24. A computer-implemented device for automatic parallel swath path generation based on initial swath path information, the device comprising:

a display device;

a data processing device;

an input device in communication with said data processing device;

an algorithmic software directing said data processing device;

a data storage unit, wherein said initial swath path information is input into said data processing device such that said data processing device, directed by said algorithmic software, automatically synthesizes information for a plurality of parallel swath paths using said initial swath path information and such that said synthesized information is recorded in said data storage unit and visually displayed via said display device;

a control system in electronic communication with said data processing device such that said control system accesses said synthesized information recorded in said data storage unit; and a land vehicle for applying predetermined products to a land area, said land vehicle being integrated with said control system such that said control system controls application of said predetermined products to said land area.

25. The computer-implemented device of claim 24 wherein said parallel swath paths comprise curved paths.

26. The computer-implemented device of claim 25 wherein said parallel swath paths further comprise linear paths.

27. The computer-implemented device of claim 26 further comprising a receiver in communication with said data processing device, wherein said receiver can receive GPS data inputs such that said data processing device can automatically synthesize said initial swath path information solely using said GPS data inputs.

28. A method for automatically generating and visually displaying a plurality of parallel swath paths using a mobile computer system having a display device, said method comprising the steps of:

traversing a land area with a GPS system;

extracting a set of original data points from said GPS system;

utilizing said original data points to direct said computer system to generate initial swath path information;

enhancing said initial swath path information by offsetting said swath path information to generate a plurality of parallel swath paths;

recording said plurality of parallel swath paths in said computer system; and extracting and visually displaying said plurality of parallel swath paths on said display device as said GPS system traverses said land area.

29. The method of claim 28 wherein said step of enhancing said initial swath path information further comprises the step of segmenting said initial swath path information to create a plurality of first line segments.

30. The method of claim 29 further comprising the step of determining a slope for each line segment within said plurality of first line segments.

31. The method of claim 30 further comprising the step of generating a perpendicular line having a predetermined length for each line segment within said plurality of first line segments, each said perpendicular line having a first end located at a central point of a respective line segment within said plurality of first line segments.

32. The method of claim 31 further comprising the step of linearly connecting a second end of each said perpendicular line to a second end of adjacent perpendicular lines to synthesize a parallel swath path.

* * * * *